Patented Dec. 20, 1949

2,491,481

UNITED STATES PATENT OFFICE 2,491,481

MONOAZO COMPOUNDS

Joseph B. Dickey, Rochester, N. Y., assignor to Eastman Kodak Company, Rochester, N. Y., a corporation of New Jersey No Drawing. Application April 5, 1945, Serial No. 586,831

2 Claims. (Cl. 260—205)

This invention relates to new azo compounds having the formula:

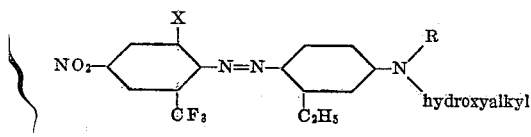

wherein R stands for a member selected from the group consisting of an alkyl group, a hydroxyalkyl group, an alkoxyalkyl group, a cyanoalkyl group and a carbalkoxyalkyl group and X stands for a member selected from the group consisting of hydrogen, a halogen atom and a trifluoromethyl group, and to materials, especially textile material, colored with the aforesaid azo compounds.

The azo compounds of my invention constitute valuable dyes for the coloration of textile materials such as organic derivatives of cellulose, wool, silk, nylon, and vinyl acetate-vinyl chloride copolymers textile materials. They are particularly of value for the coloration of cellulose acetate textile materials. Lacquers composed of cellulose esters, cellulose ethers and vinyl derivatives, for example, also can be colored. Coloration can be effected by dyeing, printing, stenciling or other suitable means.

It is an object of my invention to provide a new class of azo dye compounds. Another object of my invention is to provide a process for the coloration of organic derivatives of cellulose, wool, silk, nylon, and vinyl acetate-vinyl chloride copolymers textile materials. A further object is to provide colored textile materials which possess good fastness properties. A specific object is to provide colored cellulose acetate textile materials which have good fastness properties. Other objects will appear hereinafter.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

The dyeings obtained with the dye compounds of my invention are characterized by excellent dischargeability, excellent fastness to light and to gas fumes and by good fastness to washing and perspiration. Further, the dye compounds possess good affinity for the textile materials named, especially cellulose acetate textile materials, and can be applied rapidly thereto at relatively low temperatures. The advantages of the dye compounds appear to be realized to their greatest extent when cellulose acetate is the material to be colored.

The azo compounds of the invention can be prepared by diazotizing the compounds having the formula:

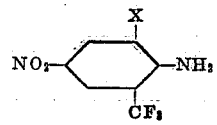

wherein X has the meaning previously assigned to it and coupling the diazonium compounds obtained with the compounds having the formula:

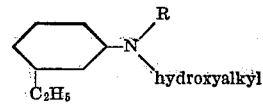

wherein R has the meaning previously assigned to it.

The following examples will serve to illustrate the new azo compounds and the manner of obtaining the same.

Example 1

7.6 grams of sodium nitrite (dry) were added slowly with vigorous stirring to 50 cc. of sulfuric acid (95–96%). The resulting mixture was stirred until a clear solution of nitrosyl sulfuric acid was obtained. The solution was cooled to 12° C. to 14° C. and 120 grams of glacial acetic acid were added with stirring. 20.6 grams of 1-amino - 2 - trifluoromethyl-4-nitrobenzene and 100 grams of glacial acetic acid were added to the mixture simultaneously with stirring at 15° C. Stirring at 15° C. was continued for two hours. The resulting diazo solution was poured into 1000 grams of ice and the resulting iced solution was added to an iced solution of 22.3 grams of N - ethyl - N - β,γ-dihydroxypropyl-3-ethylaniline in dilute hydrochloric acid. The coupling reaction which takes place was completed by adding sodium bicarbonate until the mineral acid was practically neutralized. The dye compound formed was recovered by filtration, washed with water and then dried. It has the formula

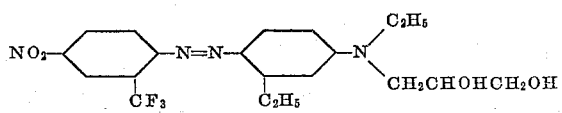

and colors cellulose acetate rayon textile materials rubine shades from its aqueous suspensions.

*Example 2*

24 grams of 1-amino-2-trifluoromethyl-4-nitro-6-chlorobenzene were diazotized and the diazonium compound resulting was coupled with 20.9 grams of N,N-di-(β-hydroxyethyl)-3-ethylaniline. The diazotization, coupling and recovery operations can be carried out in accordance with the procedure described in Example 1. The dye compound obtained has the formula:

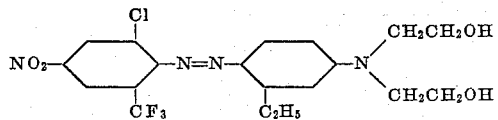

and colors cellulose acetate textile materials brownish-red shades from its aqueous suspensions.

*Example 3*

27.4 grams of 1-amino-2,6-ditrifluoromethyl-4-nitrobenzene were diazotized and the diazonium compound obtained was coupled with 25.1 grams of N-β-hydroxyethyl-N-CH₂CH₂COOCH₃-3-ethylaniline. The diazotization, coupling and recovery operations can be carried out in accordance with the procedure described in Example 1. The dye compound has the formula:

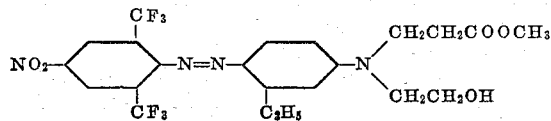

and colors cellulose acetate textile materials brownish-red from its finely divided dispersions in water.

The following tabulation further illustrates the compounds included within the scope of my invention or discovery together with the color they yield on cellulose acetate. Generally similar shades are produced on the other textile materials indicated hereinbefore. The compounds indicated below may be prepared by diazotizing the amines listed under the heading "Amine" and coupling the diazonium compounds obtained with the compounds specified in the column entitled "Coupling Component."

| Amine | Coupling Component | Color |
| --- | --- | --- |
| 1-amino-2-trifluoromethyl-4-nitrobenzene. | N,N-di-(β-hydroxyethyl)-3-ethylaniline | rubine. |
| Do. | N-β-methoxyethyl-N-β-hydroxyethyl-3-ethylaniline | Do. |
| Do. | N-β-cyanoethyl-N-β-γ-dihydroxypropyl-3-ethylaniline | Do. |
| Do. | N—CH₂COOCH₃—N-β-hydroxypropyl-3-ethylaniline | Do. |
| Do. | N—CH₂CH₂COOCH₃—N-β-hydroxyethyl-3-ethylaniline | Do. |
| 1-amino-2-trifluoromethyl-4-nitro-6-chlorobenzene. | N-methyl-N-β,γ-dihydroxypropyl-3-ethylaniline | brownish-red. |
| Do. | N—CHCH₂COOC₂H₅—N-β-hydroxyethyl-3-ethylaniline<br>    \|<br>   CH₃ | Do. |
| Do. | N—CHCH₂CN—N-β,γ-dhydroxypriopyl-3-ethylaniline<br>    \|<br>   CH₃ | Do. |
| Do. | N-n-propyl-N-β-hydroxyethyl-3-ethylaniline | Do. |
| 1-amino-2-trifluoromethyl-4-nitro-6-bromobenzene. | N-β-ethoxyethyl-N-β,γ-dihydroxypropyl-3-ethylaniline | Do. |
| Do. | N-β-hydroxyethyl-N-γ-hydroxypropyl-3-ethylaniline | Do. |
| Do. | N-ethyl-N-4,5-dihydroxy-n-amyl-3-ethylaniline | Do. |
| 1-amino-2-trifluoromethyl-4-nitro-6-fluorobenzene. | N,N-di-(β-hydroxyethyl)-3-ethylaniline | Do. |
| Do. | N-n-butyl-N-β,γ-dihydroxypropyl-3-ethylaniline | Do. |
| 1-amino-2-trifluoromethyl-4-nitro-6-iodobenzene. | N-isopropyl-N-β-hydroxyethyl-3-ethylaniline | Do. |
| Do. | N—CH₂CHCN—N-β,γ-dihydroxypropyl-3-ethylaniline<br>       \|<br>      CH₃ | Do. |
| 1-amino-2,6-di-trifluoromethyl-4-nitrobenzene. | N,N-di-(β-hydroxyethyl)-3-ethylbenzene | Do. |
| Do. | N—CH₂CH₂COOC₂H₅—N-β-hydroxyethyl-3-ethylbenzene | Do. |
| Do. | N—CHCH₂COOCH₃—N-β,γ-dihydroxypropyl-3-ethylaniline<br>    \|<br>   CH₃ | Do. |

It will be understood that the foregoing examples are intended to be illustrative and not limitative of my invention or discovery. The diazonium compounds of any of the amines indicated herein can be coupled with any of the coupling components indicated herein to yield dye compounds of the invention or discovery.

In order that the preparation of the azo compounds of my invention or discovery will be entirely clear the preparation of certain of the intermediates used in their preparation will be described or indicated hereinafter.

*m-Aminoethylbenzene (3-ethylaniline)*

The preparation of this compound is described in the Bulletin of the French Chemical Society, series 3, vol. 11, page 211.

Compounds having the general formula:

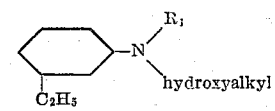

wherein R₁ stands for a member selected from the group consisting of an alkyl group, a hydroxyalkyl group, an alkoxyalkyl group, and a cyanoalkyl group can be prepared by substituting 3-ethyl-aniline for aniline or meta-toluidine in the reactions involved in preparing the compounds having the general formula:

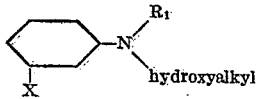

wherein X stands for hydrogen or methyl and R₁ has the meaning previously assigned to it. The preparation of these latter compounds is well known.

N-ethyl-3-ethylaniline 25 grams of 3-ethylaniline, 50 cc. of ethanol and 1 gram of Raney nickel are heated together in a shaking autoclave for 24 hours at 210° C. The reaction mixture is then cooled, filtered and distilled under reduced pressure. A 90% yield of N-ethyl-3-ethylaniline is obtained.

By the substitution of an equivalent amount of methanol, normal propyl alcohol, isopropyl alcohol, normal butyl alcohol, isobutyl alcohol, secondary butyl alcohol and normal amyl alcohol, for example, for ethanol in the above example [N-methyl-, N-n-propyl-, N-isopropyl-, N-n-butyl-, N-isobutyl-, N-secondary butyl- and N-n-amyl-] 3-ethylaniline, respectively, are obtained.

N-β-hydroxyethyl-3-ethylaniline

This compound can be prepared by reacting 3-ethylaniline with ethylene oxide (preferably in excess) in a closed reaction vessel at a temperature of about 150° C.–160° C. for 6 hours. The reaction mixture is distilled under reduced pressure to obtain the desired product.

N-β-hydroxypropyl-3-ethylaniline and N-γ-hydroxypropyl-3-ethylaniline, for example, can be obtained by substituting propylene oxide and trimethylene oxide, respectively, for ethylene oxide in the above reaction and proceeding in a substantially similar manner.

N-alkyl, N-hydroxyalkyl-3-ethylaniline compounds

These compounds can be obtained by treating an N-alkyl-3-ethylaniline compound prepared for example as indicated above with an alkylene oxide, such as those mentioned hereinbefore. These compounds can likewise be obtained by using an alkylene halohydrin in place of an alkylene oxide. Thus ethylene chlorohydrin, alpha propylene chlorohydrin, beta propylene chlorohydrin and trimethylene chlorohydrin can be used to introduce the β-hydroxyethyl, the β-hydroxypropyl, the CH₃CHCHOH and the γ-hydroxypropyl group, respectively. The β,γ-dihydroxypropyl group can be introduced into the nitrogen atom by treatment with ClCH₂CHOH-CH₂OH (1-chloropropandiol).

The N-alkyl, N-hydroxyalkyl-3-ethylaniline compounds can also be prepared by first forming the N-hydroxyalkyl-3-ethylaniline compound and alkylating to introduce the desired alkyl group on the nitrogen atom.

N-carbalkoxyalkyl, N-hydroxyalkyl-3-ethylaniline compounds

These compounds can be prepared by treating N-hydroxyalkyl-3-ethylaniline compounds with compounds such as methyl acrylate, ethyl acrylate, methyl crotonate, and ethyl crotonate, in the presence of a small amount of acetic acid, to introduce the

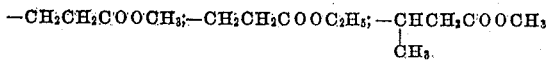

and

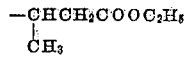

group, respectively, into the nitrogen atom. The reaction can be carried out by heating the substances indicated on a steam bath until the reaction is complete, e. g. 72 to 100 hours, and recovering the desired compound by distillation under reduced pressure, e. g. a pressure of 1–10 mm. The grouping —CH₂COO alkyl can be introduced into the nitrogen atom in accordance with the procedure described in the prior act. (See Beilstein, volume 12, pages 468 to 474, inclusive; Berichte der Deutschen Chemischen Gesellschaft, vol. 8, pages 1156 and 1157 (1875); J. Praktische Chemie, vol. 38, pages 436 and 437, and Comptes Rendus, vol. 145, page 126).

N-cyanoalkyl, N-hydroxyalkyl-3-ethylaniline compounds

These compounds can be prepared by reacting a nitrile compound such as acrylonitrile, α-methyl acrylonitrile or crotononitrile with an N-hydroxyalkyl-3-ethylaniline compound. By the use of the nitriles named:

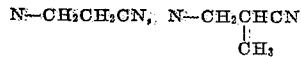

and

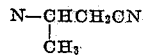

N-hydroxyalkyl-3-ethylaniline compounds, respectively, can be obtained.

N-methoxyethyl-3-ethylaniline

This compound can be prepared by reacting 3-ethylaniline with ethylene glycol monomethyl ether in the presence of Raney nickel in an autoclave for about 10 hours at a temperature of approximately 225° C. Other N-alkoxyalkyl radicals can be introduced in a similar manner. To illustrate, ethylene glycol monoethyl ether can be used in place of ethylene glycol monomethyl ether to introduce the —CH₂CH₂OC₂H₅ radical on the nitrogen atom. Hydroxyalkyl groups can be introduced into the N-alkoxyalkyl-3-ethylaniline compounds to form N-alkoxyalkyl-N-hydroxyalkyl-3-ethylaniline compounds.

Preparation of o-chloro-benzotrichloride

A stream of chlorine was bubbled into a flask containing 500 grams of o-chloro-toluene at 160° C. until an increase in weight of 400 grams was obtained. During the addition which required about 80 hours, an ultra-violet lamp was placed next to the flask, that is, the reaction was carried out under ultra-violet light. The reaction mixture resulting was distilled through a Fenske column under reduced pressure and that fraction which distilled over at 135–138° C./19 mm. consisted substantially of o-chloro-benzotrichloride. An analysis of this fraction for chlorine disclosed that it contained 59.45% chlorine, whereas the theoretical amount of chlorine for o-chloro-benzotrichloride is 62.01%.

The preparation of this compound is referred to in the Journal of the American Chemical Society, vol. 57, page 2066 (1935) wherein the same type reaction is disclosed.

Preparation of o-chloro-benzotrifluoride 200 grams of o-chloro-benzotrichloride and 190 grams of sublimed antimony trifluoride were placed in a distilling flask and the mixture was heated until reaction had set in. At this point heating was discontinued temporarily since the reaction is exothermic and heat was applied to the reaction mixture only as necessary to carry it to completion. During the reaction the desired product is distilled from the reaction vessel and recovered in a suitable vessel. The distillate thus obtained was washed with 6 N hydrochloric acid and then dried over $CaCl_2$. When distilled through a Fenske column 130 grams of o-chloro-benzotrifluoride boiling at 149–150° C. at 760 mm. were obtained. The yield is 80% of the theoretical. The use of pure sublimed antimony trifluoride has been found quite essential to the proper carrying out of the above-described reaction.

The preparation of o-chloro-benzotrifluoride is likewise disclosed in the Journal of the American Chemical Society, vol. 57, page 2066 (1935).

Preparation of 2-chloro-5-nitro-benzotrifluoride 225 grams of fuming nitric acid and 336 grams of concentrated sulfuric acid (95–96%) were mixed together and then cooled to 7° C. 198 grams of o-chloro-benzotrifluoride were then added dropwise with stirring over a period of 2½ hours while keeping the temperature between 5–10° C. The reaction mixture was stirred for one hour at 10° C. and for an additional three hours at room temperature following which it was poured into three liters of ice and water. The white precipitate formed by this treatment and which melts at 27–28° C. was extracted with chloroform, washed with dilute aqueous sodium bicarbonate solution and then distilled under reduced pressure. 2-chloro-5-nitro-benzotrifluoride boiling at 85–87° C./2 mm. is obtained. The yield was 233 grams or 94% of the theoretical yield.

Preparation of 2-amino-5-nitro-benzotrifluoride 58 grams of 2-chloro-5-nitro-benzotrifluoride, 600 cc. of ethanol and 102 grams of liquid ammonia were heated together for eight hours at 120–125° C. in a shaking autoclave. The reaction mixture was then removed and the ethanol distilled off under reduced pressure. 400 cc. of water were added to the solid remaining after the distillation and after stirring the mixture for thirty minutes, it was filtered and the precipitate obtained washed with water and dried. The precipitate consisted primarily of 2-amino-5-nitro-benzotrifluoride having a melting point of 80–88° C. The yield was 40 grams or 75% of the theoretical yield. Upon purifying the product by crystallization from methyl alcohol, 2-amino-5-nitro-benzotrifluoride melting at 90–92° C. was obtained.

Preparation of 2-amino-3-chloro-5-nitro-benzotrifluoride 20.6 grams of 2-amino-5-nitro-benzotrifluoride were dissolved in 30 cc. of warm concentrated sulfuric acid (95–96%) and then precipitated as a fine suspension by pouring into a 500 cc. 3-neck flask containing 250 cc. of cold water. One gram of $FeCl_3$ was added and chlorine was bubbled in at room temperature for four hours while stirring. A sintered glass tube was used for the chlorine addition and the reaction was run under a slight pressure head. The reaction mixture obtained was filtered and the precipitate thereby recovered was washed first with aqueous $NaHSO_3$ solution and then with water and dried. A yield of 12 grams or 50% of the theoretical yield of 2-amino-3-chloro-5-nitro-benzotrifluoride having a melting point of 107 to 109° C. was obtained.

Similarly, 2-amino-3-bromo-5-nitro-benzotrifluoride can be prepared by reacting 2-amino-5-nitro-benzotrifluoride with bromine following the general procedure described in the foregoing example.

Preparation of 2-amino-3-iodo-5-nitro-benzotrifluoride 20.6 grams of 2-amino-5-nitro-benzotrifluoride are dissolved in 300 cc. of glacial acetic acid and 20 grams of iodine monochloride in 100 cc. of glacial acetic acid are added thereto. The mixture is allowed to stand at room temperature for 2 to 3 hours after which it is heated on the steam bath for 4 to 6 hours. Upon cooling the reaction mixture is poured into water and the precipitate formed thereby is recovered by filtration, washed with an aqueous $NaHSO_3$ solution, and then with water and dried. 2-amino-3-iodo-5-nitro-benzotrifluoride is obtained.

Preparation of 2-amino-3-fluoro-5-nitro-benzotrifluoride

This compound can be prepared by the use of 2-chloro-3-trifluoromethylaniline as a starting material. 1-fluoro-2-chloro-3-trifluoromethylbenzene is first prepared and nitrated to obtain 1-fluoro-2-chloro-3-trifluoromethyl-5-nitrobenzene from which 2-amino-3-fluoro-5-nitrobenzotrifluoride is obtained by amination. The preparation of these compounds is described hereinafter.

Preparation of 1-fluoro-2-chloro-3-trifluoromethylbenzene 19.6 grams (0.1 gram mole) of 2-chloro-3-trifluoromethylaniline are diazotized, after stirring into a mixture of 150 cc. of water, 30 grams (0.3 gram mole) of concentrated hydrochloric acid and sufficient ice to maintain a temperature of 0 to 7° C. throughout, by adding a solution of 8 grams (0.113 gram mole) of 98% sodium nitrite in 15 cc. of water very rapidly below the surface in order to prevent loss of nitrous acid. Diazotization is complete when a faint test for nitrous acid on starch potassium iodide test paper lasts for 20 minutes. The diazo solution is filtered to remove a small amount of impurities.

While the diazotization is in process 6.8 grams (0.11 gram mole) of boric acid are dissolved in 20 grams (0.4 gram mole) of 40% hydrofluoric acid in a lead beaker (a paraffin coated glass beaker may also be used) keeping the temperature below 25° C. The solution is cooled to 5° C. to 10° C. and is then ready for use.

The ice cold fluoboric acid ($HBF_4$) solution is added to the diazonium solution prepared as disclosed above at a fairly rapid rate, thereby causing the precipitation of a thick gray paste of 2-chloro-3-trifluoromethyl benzene diazonium borofluoride. This paste is stirred for 30 minutes and then filtered. The solid recovered by filtration is washed with 50 cc. of water, 50 cc. of ethyl alcohol and then with 50 cc. of ether. Between the washes just mentioned, the precipitate is sucked as dry as possible and following the final washing, is spread out to facilitate evaporation of the residual ether.

The dry solid obtained as disclosed above is placed in a distillation flask and decomposed by heating with a flame at the top edge of the solid. The decomposition thus begun is permitted to continue by itself as long as it will and then heated again. By this means the borofluoride is soon quietly decomposed with the evolution of nitrogen and boron trifluoride. The desired compound 1-fluoro-2-chloro-3-trifluoromethyl benzene is distilled from the tarry residue under reduced pressure and purified by redistillation under reduced pressure. A reduced pressure of 2 to 10 mm., for example, is satisfactory.

*Preparation of 1-fluoro-2-chloro-3-trifluoromethyl-5-nitro benzene*

25 grams of 1-fluoro-2-chloro-3-trifluoromethyl benzene are dissolved in 150 cc. of concentrated sulfuric acid (specific gravity 1.84) and the resulting mixture is cooled to 0° C. 20 grams of fuming nitric acid in 50 cc. of concentrated sulfuric acid (specific gravity 1.84) are then added slowly. The reaction mixture resulting is then slowly warmed to 50° C. and after a short time poured onto ice. A yellowish precipitate 1-fluoro-2-chloro-3-trifluoromethyl-5-nitro benzene, is formed and is recovered by filtration, washed with water and dried.

*Preparation of 2-amino-3-fluoro-5-nitro benzotrifluoride*

25 grams of 1-fluoro-2-chloro-3-trifluoromethyl-5-nitrobenzene are placed in an autoclave together with 250 cc. of concentrated aqueous ammonia, warmed to 120° C. for 10 hours and then cooled. The reaction mixture is filtered and the precipitate obtained upon filtration is washed with water and dried. The precipitate consists of 2-amino-3-fluoro-5-nitro-benzotrifluoride. It may be purified, if desired, by crystallization from acetic acid.

*Preparation of 1-amino-4-nitro-2,6-di-trifluoromethyl benzene*

This compound can be prepared by following the reactions described in connection with the preparation of 2-amino-3-chloro-5-nitro-benzotrifluoride but starting with 1-chloro-2,6-dimethyl benzene instead of o-chloro toluene. The final chlorination reaction involved in the preparation of 2-amino-3-chloro-5-nitro-benzotrifluoride will of course be omitted. 1-chloro-2,6-di-trichloromethyl benzene; 1-chloro-2,6-di-trifluoromethyl benzene; 1-chloro-4-nitro-2,6-di-trifluoromethyl benzene and 1-amino-4-nitro-2,6-di-trifluoromethyl benzene, respectively, are obtained.

The azo compounds of my invention may be advantageously directly applied to the textile material undergoing coloration in the form of an aqueous suspension which can be prepared by grinding the dye to a paste, in the presence of a sulfonated oil soap, or other suitable dispersing agent and dispersing the resulting paste in water. Direct dyeing operations can, with advantage, be conducted at temperatures of about 60° C. to 85° C., but any suitable temperature may be used.

Thus, the textile material to be dyed or colored is ordinarily added to the dyebath at a temperature lower than that at which the main portion of the dyeing is to be effected, e. g. a temperature of from 45° to 55° C. Following this the temperature is raised to that selected for carrying out the operation. The temperature at which the process is carried out may vary somewhat, depending upon the particular material undergoing coloration. As understood by those skilled in the art, the intensity of dyeing can be varied by varying the proportion of dye to the material undergoing preparation. Generally speaking, 1 to 3 per cent by weight of the dye to material is employed, although any desired proportions can be used.

Suitable dispersing agents are disclosed in U. S. Patent 2,115,030, issuing April 26, 1938. The process disclosed in the aforesaid patent for the dyeing of cellulose acetate can be used in applying the dyes of the present invention to cellulose acetate. While a satisfactory method for dyeing has been disclosed herein, it will be understood that any other suitable methods for dyeing the non-vegetable textile materials named herein can be employed. Lacquers may be colored with the dye compounds of my invention by the methods customarily employed in the lacquer art.

The term nylon is intended to describe a linear polyamide resin such as set forth in the United States Patent 2,071,250, dated February 16, 1937.

What I claim is:

1. The azo compounds having the formula:

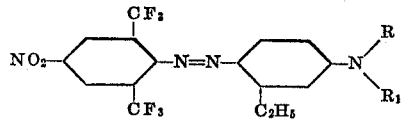

wherein R stands for a $C_nH_{2n}COOC_mH_{2m+1}$ group wherein $m$ stands for a number selected from 1 and 2 and $n$ stands for a number selected from 1, 2 and 3 and $R_1$ stands for a hydroxyalkyl group having 2 to 5, inclusive, carbon atoms and wherein said hydroxyalkyl group contains from 1 to 2 hydroxy groups and has less hydroxy groups than carbon atoms.

2. The azo compound having the formula:

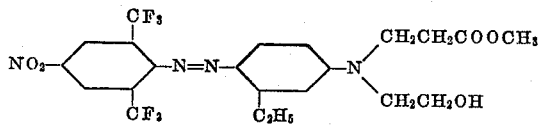

JOSEPH B. DICKEY.

REFERENCES CITED

The following references are of record in the file of this patent:

UNITED STATES PATENTS

| Number | Name | Date |
|---|---|---|
| 2,153,018 | Heyna et al. | Apr. 4, 1939 |
| 2,194,926 | Daudt et al. | Mar. 26, 1940 |
| 2,194,927 | Daudt et al. | Mar. 26, 1940 |
| 2,231,707 | Dickey et al. | Feb. 11, 1941 |
| 2,273,700 | McNally et al. | Apr. 17, 1945 |
| 2,391,179 | McNally et al. | Dec. 18, 1945 |